Dec. 18, 1923.

F. A. MOORE

MULTIPLE SPINDLE MACHINE

Filed Jan. 12, 1921

INVENTOR
FRANCIS A. MOORE
BY
D. Anthony Usina,
ATTORNEY

Dec. 18, 1923.

F. A. MOORE 1,477,888

MULTIPLE SPINDLE MACHINE

Filed Jan. 12, 1921   2 Sheets-Sheet 2

INVENTOR
FRANCIS A. MOORE
BY
Anthony Usina, ATTORNEY

Patented Dec. 18, 1923.

1,477,888

UNITED STATES PATENT OFFICE.

FRANCIS A. MOORE, OF SPRINGFIELD, MASSACHUSETTS, ASSIGNOR TO BAUSCH MACHINE TOOL COMPANY, A CORPORATION OF MASSACHUSETTS.

MULTIPLE-SPINDLE MACHINE.

Application filed January 12, 1921. Serial No. 436,657.

*To all whom it may concern:*

Be it known that I, FRANCIS A. MOORE, a citizen of the United States, residing in Springfield, Massachusetts, have invented certain new and useful Improvements in Multiple-Spindle Machines, of which the following is a specification.

In multiple spindle drilling machines of the type which carry the spindles in laterally adjustable arms each arm has usually supported its spindle so that the latter could be reset in a different longitudinal position. Some of these machines, however, have spindles which are carried in a plate or other common supporting means fastened to or forming a fixed part of the spindle-carrying head, so that the spindles may be placed closer together than they can be where each is carried in a separate arm; and generally such machines have had no provision for vertical adjustment of the spindles. A slight vertical adjustment is very desirable to compensate for the wear and regrinding of the drills and for other reasons.

My invention provides an adjusting means having particular application to such an arrangement of spindles. My invention is applicable also to multiple spindle machines used not only for drilling but for reaming, tapping, boring, counterboring, countersinking, spot facing and other operations.

The accompanying drawings illustrate an embodiment of the invention.

Figure 1:
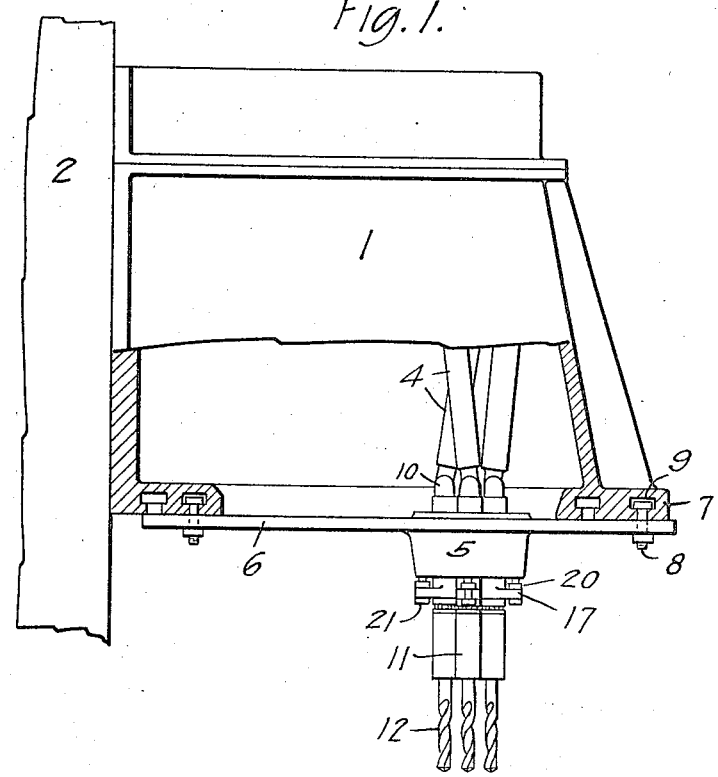
Fig. 1 is a partial side elevation, partly in section, of a vertical multiple spindle drilling machine, showing a plate carrying a cluster of three drills close together.
Figure 4:
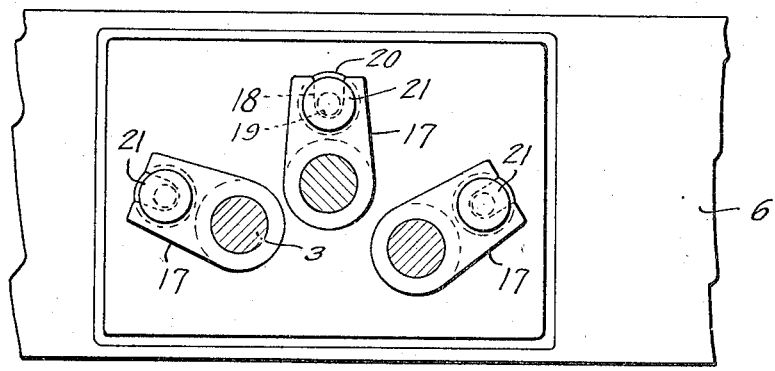
Fig. 4 is an underside plan view of a portion of the plate, showing the three spindles in cross-section.

In the machine illustrated the head 1 is arranged to travel up and down on a post, a part of which is shown at 2. The usual or any suitable driving gearing is arranged in the upper part of the head and drives the spindles 3 (Fig. 3) through the usual flexible driving connections 4. The spindles are carried in a boss 5 on a plate 6 which is fastened at its edges to the flange 7 of the head by means of bolts 8 having their heads located in grooves 9 of the said flange 7. The plate 6 may be used for a cluster of spindles in addition to the usual adjustable arms carrying individual spindles, or it may carry the only spindles which are to be used for a given operation, or it may be a fixed part of the head of the machine.

Figure 2:
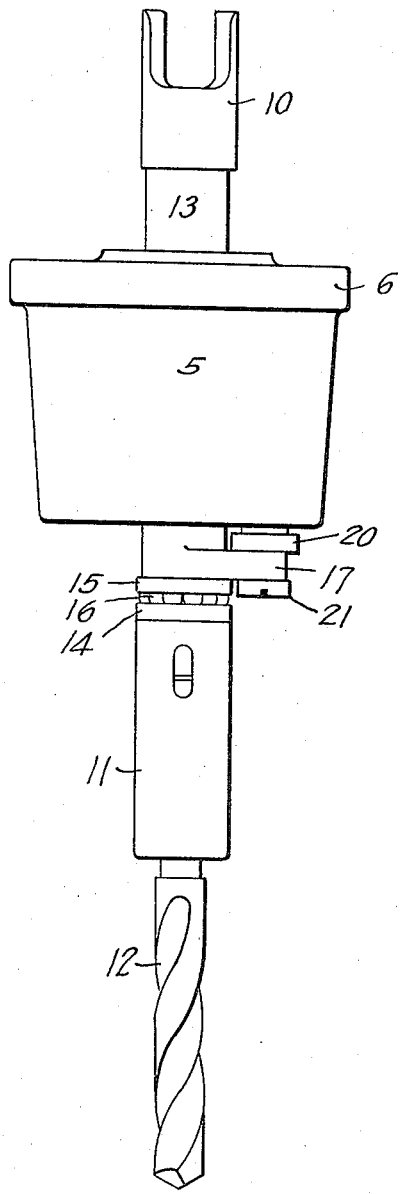
Fig. 2 is a side elevation of a part of the plate and one of the spindles with a drill therein; the other spindles being omitted for the sake of clearness.
Figure 3:
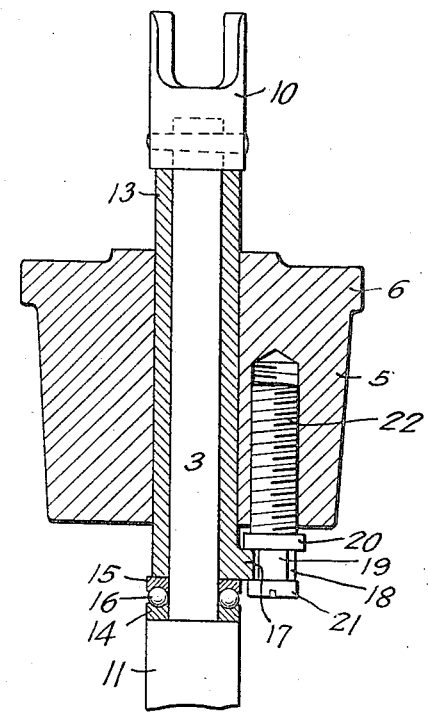
Fig. 3 is a vertical section of the bearing of one of such spindles.

In Figs. 2 and 3 the spindle 3 is shown with a part 10 of a universal joint at its upper end for connection to the flexible drive and with a socket 11 at its lower end to receive the drill 12. The bearing sleeves 13 are mounted as close together as required in the boss 5, or it may be in separate bosses where space permits, the joint member 10 resting on the upper end of the sleeve, and the socket member 11 bearing on the lower end of the sleeve through a thrust bearing comprising rings 14 and 15 and balls 16.

Each of the bearing sleeves 13 is provided with a lateral extension 17 projecting under a portion of the plate or the boss 5. By arranging the arms 17 outside of the spaces between the spindles, as at the diverging angles illustrated, it is possible to place the spindles as close together as if there were no adjusting means, the spacing being limited only by the strength of the supporting plate as usual. In the end of each arm 17 is a slot 18 embracing the shank 19 of an adjusting screw which is provided with a circular rib or shoulder 20 engaging one face of the projection 17 and with a head or shoulder 21 engaging the opposite face thereof, so that as the screw is advanced or retracted it will carry with it the bearing sleeve 13 and the spindle. The portion 22 of the screw is threaded into the boss 5 so that by turning it to one direction or the other a very fine longitudinal adjustment of the bearing can be effected and by the same movement the bearing is held firmly in its adjusted position. The head 21 of the screw may be cut for operation by a screw driver, as shown, or squared for operation by a wrench.

The entire construction is extremely simple and can be most conveniently and quickly operated. The screw and bearing are assembled for setting them in place by simply placing the shank 19 of the screw in the open slot 18. The screw is the only additional part required as compared with the ordinary spindles which have no adjustment.

The invention includes not only the head or other supporting means in combination with the spindles as described, but also the separate spindles with their bearings. For example, such spindles may be sold as separate articles with their bearings having suitable extensions for engagement by an adjusting means which will hold the bearing against rotation and against accidental longitudinal movement in either direction in the supporting plate.

Though I have described with great particularity of detail a certain embodiment of my invention yet it is not to be understood therefrom that the invention is restricted to the particular embodiment disclosed. Various modifications thereof in detail and in the arrangement of the parts may be made by those skilled in the art without departing from the invention as defined in the following claim.

What I claim is—

A multiple spindle machine having a head, a plate attached to said head and carrying a plurality of spindle bearings in fixed lateral relation to each other in said plate, means for separately adjusting each of said bearings longitudinally, said plate being laterally adjustable on said head, and flexible driving means carried by the head for driving the spindles in different lateral positions of the plate and different longitudinal adjustments of the spindle bearings.

In witness whereof, I have hereunto signed my name.

FRANCIS A. MOORE.